United States Patent [19]
Affa et al.

[11] Patent Number: 4,691,741
[45] Date of Patent: Sep. 8, 1987

[54] SHROUD FOR AIRCRAFT DUCT

[75] Inventors: Steven N. Affa, Valencia; Ira R. Newman, Sun Valley; Robert S. Allison, San Gabriel, all of Calif.

[73] Assignee: General Connectors Corporation, Burbank, Calif.

[21] Appl. No.: 754,283

[22] Filed: Jul. 12, 1985

Related U.S. Application Data

[60] Division of Ser. No. 500,073, Jun. 1, 1983, and a continuation of Ser. No. 412,515, Aug. 30, 1982, abandoned.

[51] Int. Cl.⁴ .............................................. F16L 9/18
[52] U.S. Cl. .................................... 138/113; 138/114; 138/148; 138/149
[58] Field of Search ............... 138/111, 113, 114, 148, 138/149, 109; 181/207; 285/133 R

[56] References Cited

U.S. PATENT DOCUMENTS

| | | | |
|---|---|---|---|
| 2,076,216 | 4/1937 | Stadtfeld | 138/113 |
| 3,471,177 | 10/1929 | Garrett et al. | 138/114 X |
| 3,911,961 | 10/1975 | Peyton et al. | 138/113 |
| 3,918,530 | 11/1975 | Nyholm | 181/207 X |
| 4,303,105 | 12/1981 | Rohner | 138/113 X |

Primary Examiner—James E. Bryant, III
Attorney, Agent, or Firm—Julius Louis Rubinstein

[57] ABSTRACT

The shroud is formed from sheet material and is cylindrical in shape. A plurality of spacers are associated with the sheet material. These spacers are designed to engage the outer surface of a duct to hold the cylindrical sheet material in radially outwardly-spaced relationship to the duct, defining thereby an insulating air gap between the outer surface of the duct and the shroud. The angular space between the spacers serves as gas channels to permit gas to flow between the shroud and the outer surface of the duct, along the length of the duct. The shroud has a straight axially-extending slot along its entire length for easy removal from a duct. An axially-extending edge receiving pocket is formed on the shroud adjacent to the slot for receiving the adjacent longitudinally extending edge of the slot to hold the shroud in a cylindrical shape and to provide a gas tight closure for the slot.

4 Claims, 5 Drawing Figures

SHROUD FOR AIRCRAFT DUCT

This is a division of patent application Ser. No. 500,073, filed June 1, 1983, and a continuation of a Parent patent application Ser. No. 412,515, filed Aug. 30, 1982 (now abandoned).

This invention relates to a protective shroud for ducts used in aircraft.

STATEMENT OF PROBLEM

Ducts installed in modern aircraft are formed from titanium because it is strong and light. However, titanium is very expensive and, in addition, it can be attacked and corroded by exposure to Skydral. Skydral is a hydraulic fluid widely used in aircraft because of its many desirable physical properties. However, it does react with and corrode titanium. Since aircraft have very many hydraulic ducts, leakage in these ducts, which is almost always present, permits drops of the Skydral to fall on and eat away the aircraft ducts, causing leakage in the ducts and danger to the aircraft. Consequently, the ducts have to be examined very frequently to make certain they are in a safe condition. This increases aircraft downtime.

The ducts are generally covered by titanium shrouds for protection against corrosion. These shrouds are themselves subject to attack by Skydral and, in addition, they are costly and increase the weight of the aircraft. They do protect the ducts and increase their useful worklife somewhat. However, when the shrouds become too corroded to protect the ducts, they have to be removed. This involves removing the ducts as well, because the attachment of the titanium shrouds to the titanium ducts is too difficult to be done in the field, so that the ducts and the shrouds have to be sent to the manufacturers to be refinished.

This is costly because it is necessary to keep a large supply of spare ducts in stock to prevent the aircraft from being immobilized for long periods of time while the ducts and shrouds are being repaired. Another disadvantage in the use of the titanium ducts and shrouds is that aircraft vibration causes the shrouds to vibrate with the ducts producing metal fatigue. This is another cause of duct and shroud failure.

In addition, the titanium shroud gets just as hot as the duct it covers. This requires additional insulation, to protect heat-sensitive aircraft components from the heat of the shrouds. This extra insulation increases the weight the aircraft must carry, and in modern high-speed aircraft any increase in weight produces a much larger decrease in aircraft range or carrying capacity.

PRIOR ART

Heretofore, as exemplified by U.S. Pat. No. 3,911,961 to Peyton, ducts for aircraft were surrounded by light weight shrouds formed from metal foil reinforced by a thin ply of resin impregnated fabric. The air gap between the duct and the surrounding shroud served as a heat insulator. However, this patent was not concerned with the problem that this invention is concerned with; namely providing a shroud which is impervious to Skydral and which is insulated from the heat and vibration from the titanium duct, and which is provided with an air or gas channel extending along the entire length of the duct.

In this patent, as seen in FIG. 4, the molded semicircular fiberglass rings spaced along the duct prevent the passage of gas along the length of the duct, and in addition they do not adequately insulate the shroud from heat and aircraft vibration. Consequently shroud 11 is subjected to destructive aircraft vibration.

The patent to Hallwood U.S. Pat. No. 3,628,814 deals with temporary joints for steam pipes, and so is not concerned with the problem this invention deals with. In particular Hallwood discloses an outer duct or shroud 30 formed from polyethylene or polyvinal chlorides that cover the conduit ends. Hallwood does not disclose any means for isolating shroud 30 from heat or vibration, which this invention is concerned with.

The patent to Isenberg U.S. Pat. No. 2,545,030 discloses a conveyor pipe 11 surrounded by a shroud formed from piles of asbestos, felt, paper, and canvas. Isenberg does not disclose any means for isolating the outer shroud 30 from vibration and does not provide a gas passage intermediate to the conveyor pipe and the shroud, which extends along the entire length of the pipe.

The patent to Norris U.S. Pat. No. 488,248, discloses a steam pipe surrounded by a shroud formed from a layer of asbestos. But Norris does not disclose an air channel between the steam pipe and shroud extending along the length of the shroud and he does not protect the shroud from heat and vibration from the steam pipe.

It is apparent that it would be very advantageous if the titanium duct could be wrapped in an easily-removable shroud which is light, strong, and impervious to Skydral, and which is inexpensive to manufacture, and which is a poor conductor of heat. An important object of this invention, therefore, is to provide such a shroud.

This and other objects of this invention will become more apparent and better understood in light of the accompany specification and drawings herein.

Figures 1, 2, 3, 4, 5:
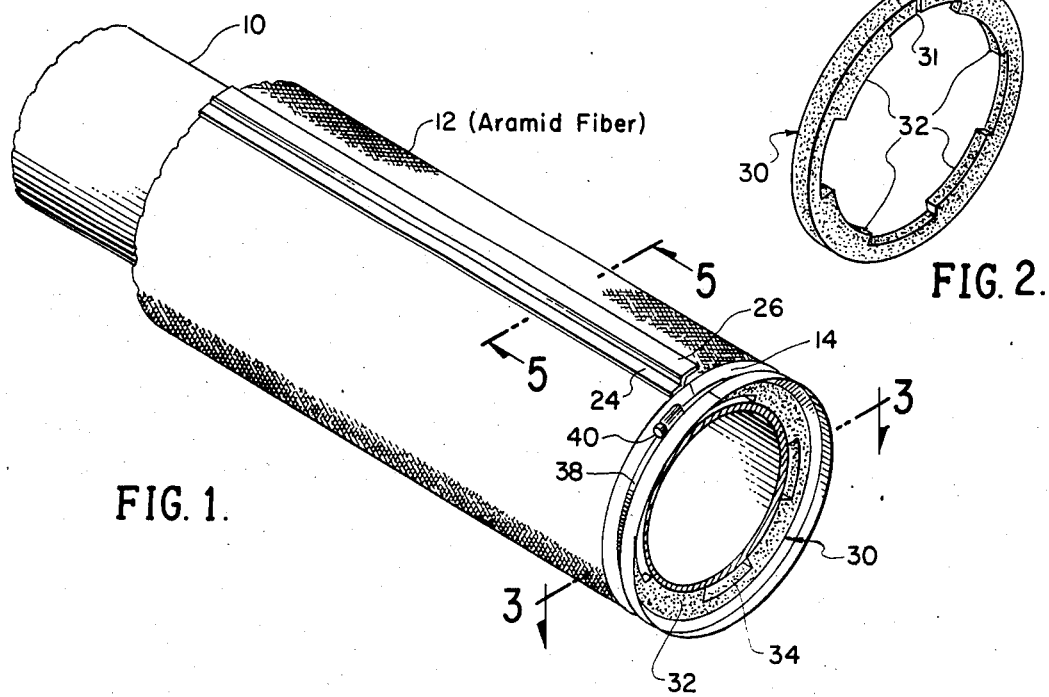
FIG. 1 is a perspective view of a titanium duct with a shroud covering the duct constructed according to the principles of this invention.
FIG. 2 is a perspective view of a spacer member which is to be mounted on the inner surface of a shroud.
FIG. 3 is an elevational sectional view of the junction of two shrouds taken on the line 3—3 of FIG. 1 and disclosing the gas passages formed in the spacer members connection both shrouds.
FIG. 4 is a sectional view taken in line 4—4 of FIG. 3.
FIG. 5 is a sectional view of a portion of the periphery of the shroud disclosing the edge receiving pocket which prevents gas from passing through the slot in the duct and which makes certain the assembled shroud has as uniform diameter along its entire length.

Referring now to FIG. 1 of the drawing, a titanium duct 10 is surrounded by a generally cylindrical shroud 12. The shroud is formed from a sheet material such as an organic aramid fiber which does not react with Skydral, the hydraulic fluid most commonly used in aircraft. Aramid fibers come in a number of forms, but the one most suitable for use in shrouds has a braking tenacity of 11 g/den, tensile strength at 1,000 psi of 410, and a braking elongation percent of 3.6. One of the aramid fibers which has these characteristics is known in the trade as Kevlar.

This aramid fiber is available in cloth, but to prevent the Skydral from penetrating the cloth through the weaves in the cloth, the cloth is immersed in phenolic to close up the hole in the weave and thereby make the cloth impervious to Skydral. Then the cloth is wrapped around a mandrel and baked to form it into a desired shape, usually cylindrical, although it is understood that the shroud can have other tube-like shapes in accordance with the functions required.

The inner surface of the cylindrical shroud may be coated or sprayed with aluminum paint or cement to reflect heat coming from the duct so the shroud will have a lower temperature and to make the shroud fluid resistant. In addition, the cylindrical shroud may be coated with a suitable fire retardent cement. If desired, the surface of the sheet material forming the shroud may be provided with a rigidizing waffle pattern for strength.

The cylinder is formed with a straight slot extending along its entire length defining slot edges 18 and 20, see FIG. 5. Since the formed cylindrical shroud is somewhat resilient the adjacent edges of the slot can be pulled apart far enough so the shroud can be easily installed or removed from the duct. An axially extending edge receiving the pocket 27 is formed on the shroud adjacent to the slot for receiving the slot edge 20 to hold the sheet material in a cylindrical shape and to provide a gas-tight closure for the slot (See FIG. 5).

The pocket is formed by mounting flange 24 secured by a suitable means to the surface of the elastomeric material adjacent to the slot. A radially outwardly projecting pocket flange 26 is secured to the mounting flange 24 for receiving the opposite edge of the shroud at the slot. In assembled relationship, edge 20 of the pocket to provide a gas-tight closure for the slot. In addition, this arrangement maintains the diameter of the shroud uniform.

The shroud is provided with a plurality of radially inwardly extending clamping band receiving grooves 14 situated transverse to the axial length of the shroud for receiving a clamping band, see FIGS. 1 and 3. The clamping bands 38 are designed to be mounted on the outer surface of the base 28 of the grooves 14. The inner surface of base 28 of grooves 14 serves as a support structure to hold generally-cylindrical spacer rings or members 30. The spacer rings are provided with identical uniformly angularly-spaced inwardly projecting abutments 32 for engaging the outer surface of the duct 10 so that the shroud is held in uniformly radially outwardly spaced relationship to the duct, defining thereby an insulating air gap around the duct, see FIG. 4.

The abutments 32 are preferably formed from silicone impregnated rubber. The use of silicone impregnated rubber for the spacer members or at least the abutments is important, because this material is a poor transmitter of heat and consequently prevents heat from the duct from reaching the shroud 12 through the abutments 32. In addition, the resilience of the abutment isolates the shroud from direct duct vibration so the shroud is not subject to destructive vibration. Consequently, in use, the surface of the shroud is comparatively cool and vibration free. This eliminates the necessity of extra insulation that might be required when the shroud covering a duct is mounted near heat-sensitive components in the aircraft.

These features give the spacer rings the combined function, among other things, of isolating the shroud from the vibration and heat in the duct. The spacer rings are glued on or otherwise suitably attached to the inner surface to the base 28 of the grooves 14 (see FIGS. 3 and 4). In this way when the clamping band 38 is mounted in a groove 14 and tightened, the shroud is clamped to the duct 10 mounted inside the shroud, see FIGS. 3 and 4.

In addition, as seen in FIG. 2, the spacer rings 30 are slotted at 31. The spacer rings are mounted on the shroud 12 with the slots 31 aligned with the slot in the cylindrical shroud. In this way, when the edges of the slot in the shroud are pulled apart, the edges of the slot 31 of spacer rings also pull away from each other so that the shroud can be easily removed from or mounted on a duct.

The abutments 32 on the spacer members are disposed in uniformly angularly spaced relationship to each other. The angular spaces 34 between the abutments 32 function as channels to permit gas to flow through the spacer rings or members 30 between the shroud and the outer surface of the duct along the entire length of the duct.

The channels are important because it is necessary to insert duct leak detectors 36 along the length of the shroud, (see FIG. 3). These leak detectors are generally thermal in function and can detect an increase in temperature caused when a leak in the duct allows hot gases to enter the insulating air gap between the duct and the shroud. When these hot gases encounter the detector 36 they cause a warning signal to operate, notifying the crew about the leak.

As shown in FIG. 3, if a leak in the cut occurred to the right of the junction between the two shrouds, the hot escaping gases could not reach the detector 36 without the communication provided by channels 34 extending through the spacer ring 30.

In order to hold a shroud on the duct, a generally conventional adjustable cylindrical clamping band 38 is mounted in the groove 14. The screw adjustment 40 on the clamping band permits the clamp to be squeezed down on the shroud thereby forcing the abutments 32 against the periphery of the duct (see FIGS. 2, 3 and 4). This holds the shroud in place on the duct.

Having shown and described the invention, what I claim as new is:

1. A shroud for a duct comprising a generally cylindrical resilient tube formed from an organic aramid fiber, said tube having an axially extending slot along its entire length whereby adjacent edges of the tube by the slot can be pulled apart so the tube can be inserted over a duct, at least one radially inwardly extending clamping band receiving groove situated transverse to the axis of said tube, said groove including a base which is radially inwardly spaced from the circumferential periphery of said cylindrical tube, said base adapted to receive a clamping band whereby the cylindrical shroud can be clamped to a duct mounted therein, a generally cylindrical spacer member formed from a selected elastomeric material mounted on the inner surface of said base member so the clamping band can clamp the shroud to said duct, said spacer member including a plurality of angularly spaced inwardly projecting abutments adapted to engage the peripheral surface of a duct defining thereby an insulating air gap between said shroud and the surface of said duct, the space between said angularly spaced inwardly projecting abutments defining channels through said spacer member for the passage of gases along the length of the air gap.

2. The shroud described in claim wherein the inner surface of the shroud is coated with a fire resistant aluminum material to reduce the temperature of the shroud, and wherein the surface of the shroud is provided with a rigidizing waffle pattern formed therein for strength.

3. The shroud described in claim 1 including a longitudinally extending mounting flange mounted on said shroud along the length of said slot adjacent one edge of the slot, a pocket flange attached to said mounting flange, said pocket flange in radially outwardly spaced relation to the mounting flange and extending along the length of said slot adjacent said one edge of the slot defining thereby an edge receiving pocket, the opposite edge of said slot mounted in said pocket to provide a gas-tight closure for the slot in said shroud and to maintain the diamter of the shroud constant.

4. The shroud described in claim 1 wherein the spacer member is slotted, said slot in said spacer member aligned with the slot in said tube so that the edges of the entire slot with the spacer member attached thereto can be separated for easy insertion or removal of the shroud from a duct.

* * * * *